Figure 1:
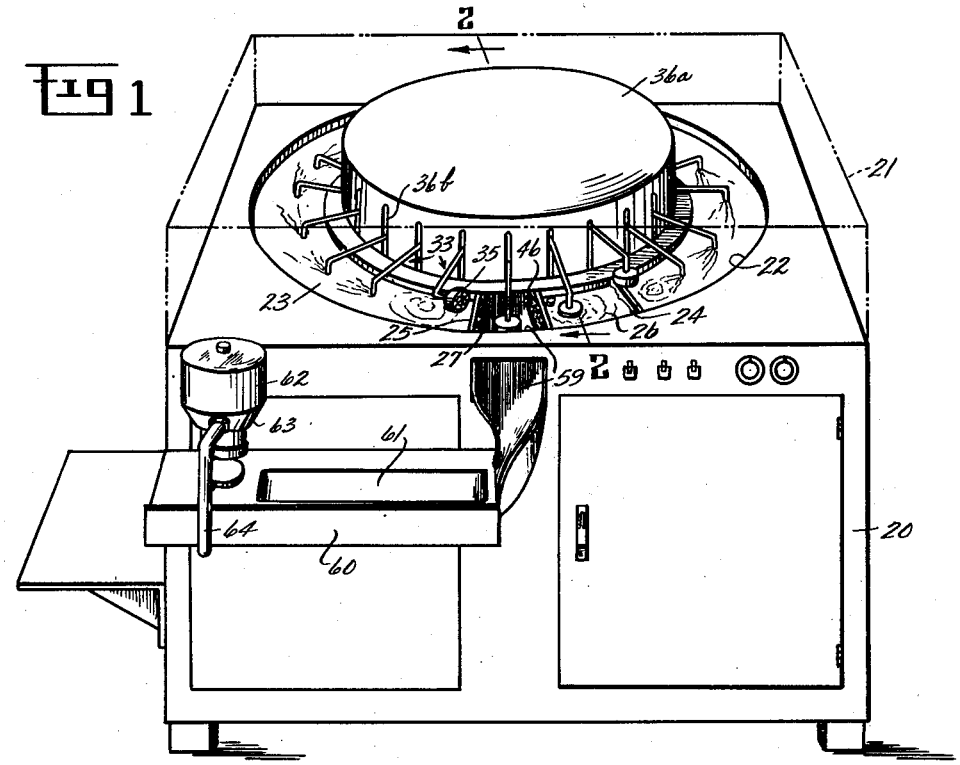

Oct. 21, 1952     J. C. SINKWITZ ET AL     2,614,485
APPARATUS FOR COOKING ARTICLES OF FOOD IN DEEP GREASE
Filed April 23, 1947     4 Sheets-Sheet 1

INVENTOR.
JOSEPH C. SINKWITZ
ROMAN SZPUR
BY

ATTORNEY

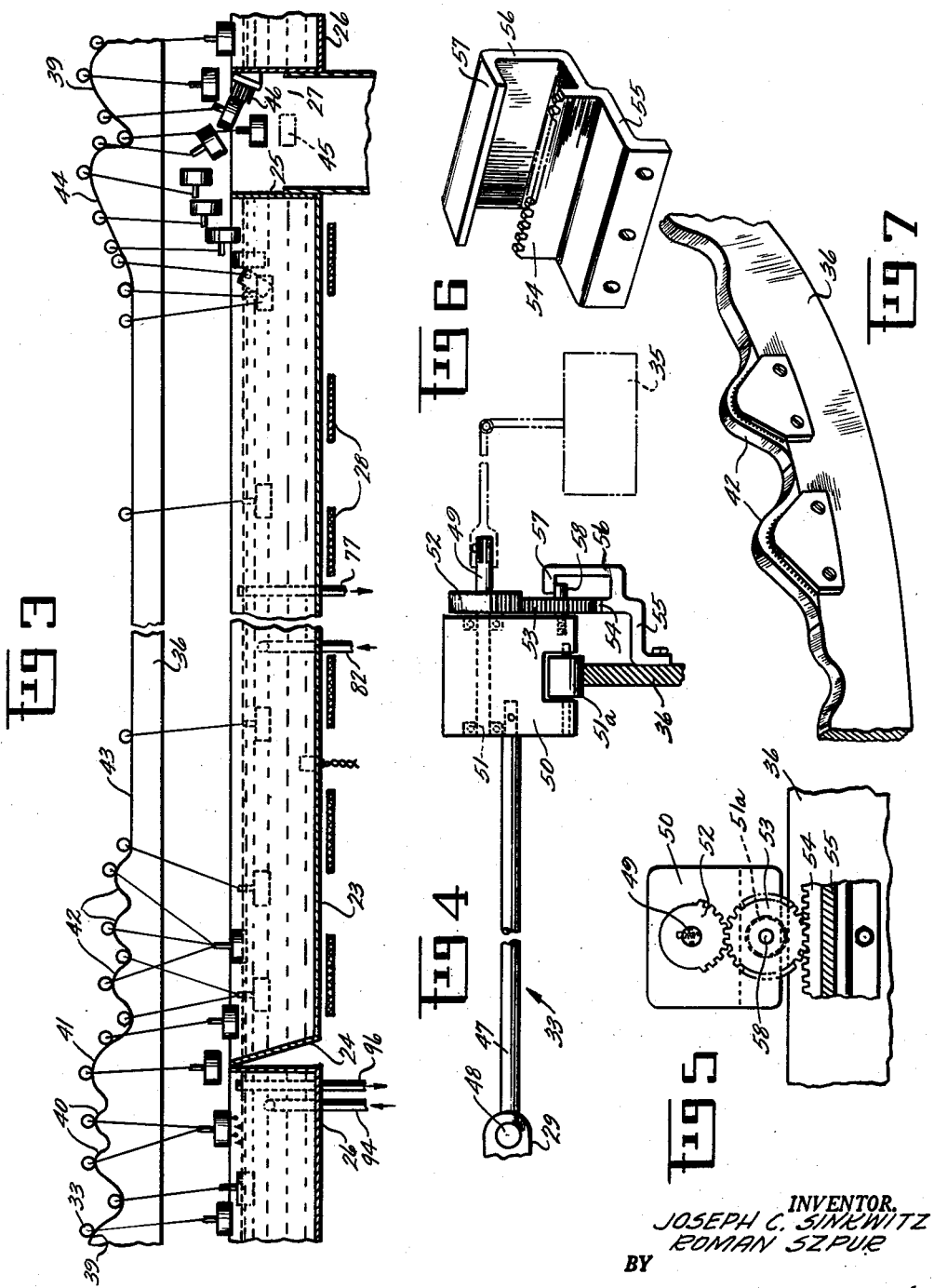

Oct. 21, 1952 J. C. SINKWITZ ET AL 2,614,485
APPARATUS FOR COOKING ARTICLES OF FOOD IN DEEP GREASE
Filed April 23, 1947 4 Sheets-Sheet 3

INVENTOR.
JOSEPH C. SINKWITZ
ROMAN SZPUR
BY
ATTORNEY

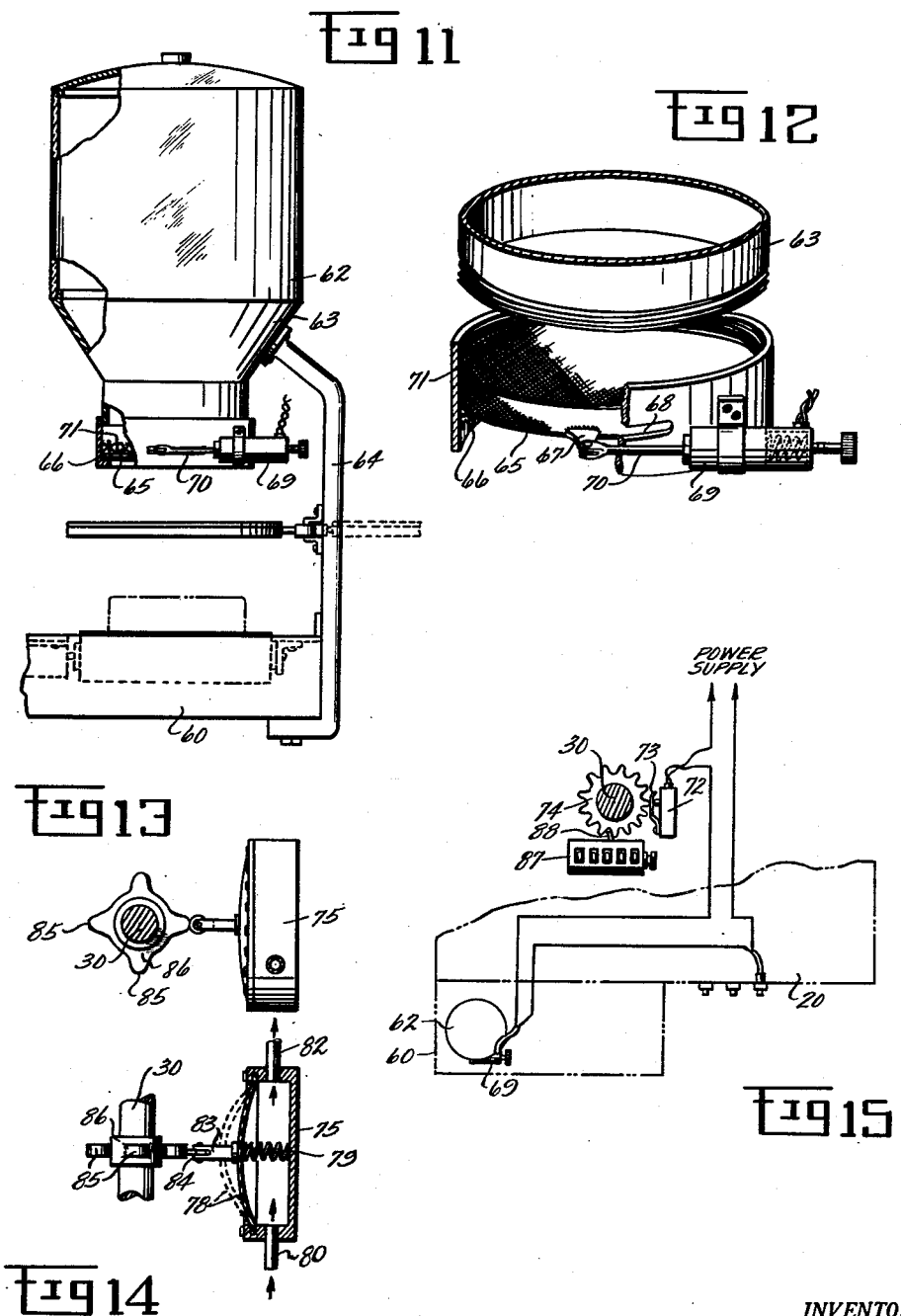

Patented Oct. 21, 1952

2,614,485

UNITED STATES PATENT OFFICE 2,614,485

APPARATUS FOR COOKING ARTICLES OF FOOD IN DEEP GREASE

Joseph C. Sinkwitz and Roman Szpur, Dayton, Ohio, assignors, by direct and mesne assignments, to William F. Chapel, Dayton, Ohio Application April 23, 1947, Serial No. 743,338

4 Claims. (Cl. 99—404)

1

This invention relates to an apparatus for cooking articles of food in deep grease and is designed primarily for cooking waffles of the type which are cooked on a mold in deep grease.

The usual method of cooking waffles of this type is to provide the mold with a handle or stem by which it is dipped in a batter and, with batter adhering thereto, is then immersed in hot grease to cook the batter. A single operator may manipulate a series of molds in rotation to immerse succeeding molds in the grease while the waffles on the preceding molds are cooking but the number of molds which can be so manipulated is limited by the time required to cook a waffle, which is quite thin, and even when practiced by a skilled operator the method is very slow and the waffles are correspondingly expensive.

The main object of the invention is to provide an apparatus which will operate automatically to successively dip a plurality of molds in the batter, immerse the same in the hot grease and discharge the waffle as soon as it is properly cooked.

A further object of the invention is to provide such an apparatus which is continuous in operation and maintains each mold in the cooking liquid for a predetermined interval of time.

A further object of the invention is to provide such an apparatus which will remove excess batter from the mold as it is withdrawn from the batter receptacle.

A further object of the invention is to provide such an apparatus which will so manipulate the mold when it first enters the hot grease as to prevent the waffle from adhering tightly thereto.

A further object of the invention is to provide such an apparatus which will drain the grease from the mold and cooked waffle as they are moved out of the cooking receptacle.

A further object of the invention is to provide such an apparatus which will discharge the cooked waffle from its mold and invert the waffle to permit sugar, or the like, to be applied to the inverted bottom thereof.

A further object of the invention is to provide such an apparatus which will automatically apply sugar to the waffle.

A further object of the invention is to provide such an apparatus which will automatically supply grease to the cooking vessel and maintain the same at a substantially constant level therein.

Other objects of the invention may appear as the apparatus is described in detail.

2

Figure 2:
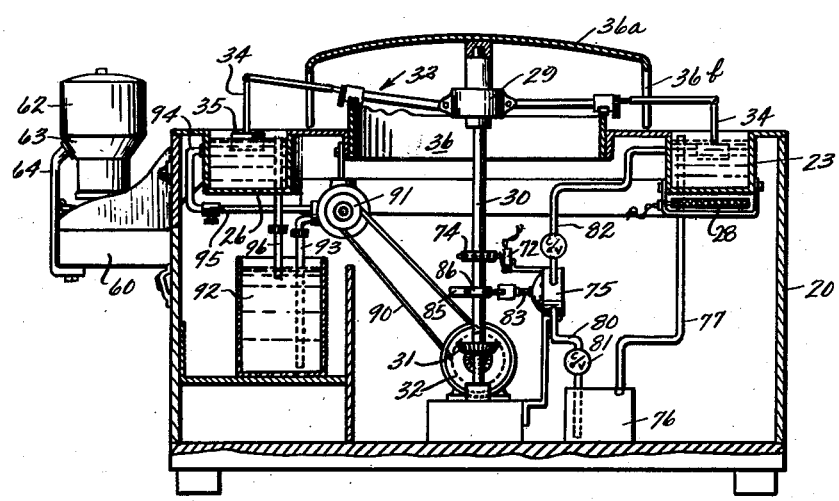
Figure 8:
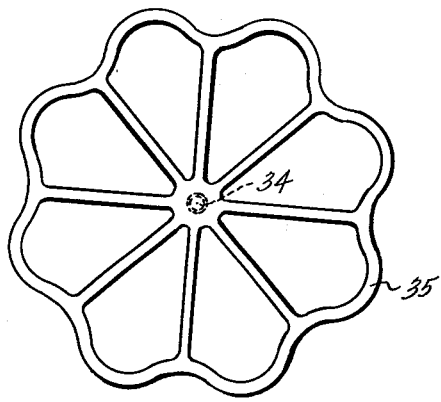
Figure 9:
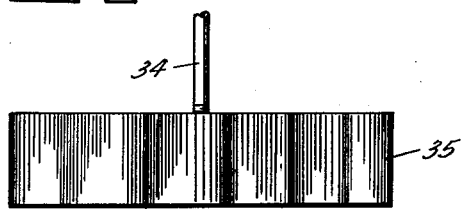
Figure 10:
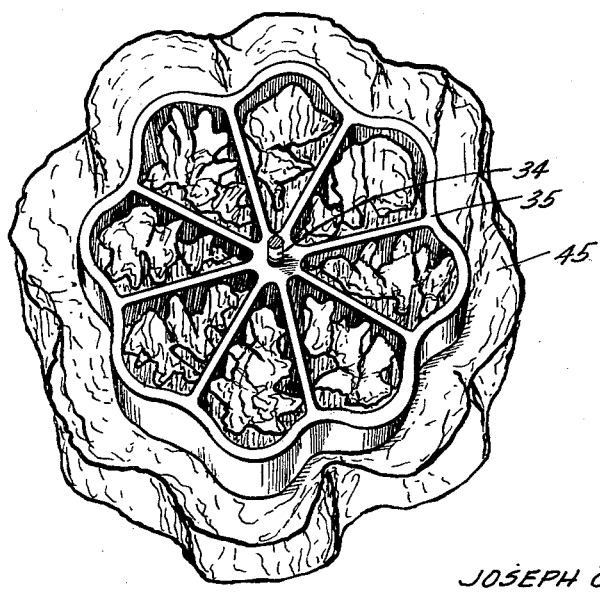

In the accompanying drawings Fig. 1 is a perspective view of an apparatus embodying our invention; Fig. 2 is a vertical section taken on the line 2—2 of Fig. 1; Fig. 3 is a diagrammatic layout illustrating the movements of the mold through the apparatus; Fig. 4 is a detail view of one of the mold supporting members showing the means for tilting the mold; Fig. 5 is an end elevation of the device of Fig. 4; Fig. 6 is a perspective view of the rack which cooperates with the tilting device; Fig. 7 is a fractional detail view of a portion of the cam; Fig. 8 is a plan view of the mold; Fig. 9 is a side elevation of the mold; Fig. 10 is a perspective view of the mold with the waffle thereon; Fig. 11 is an elevation, partly broken away, of the sugar dispenser; Fig. 12 is a detail view of the sugar dispensing device, partly broken away, and with the elements separated; Fig. 13 is a plan view of the pump for supplying grease to the cooking vessel; Fig. 14 is a vertical section taken through the pump; and Fig. 15 is a diagram of the circuit for the electrically operated sugar dispenser.

In these drawings we have illustrated one embodiment of our invention and have shown the same as designed for cooking waffles of the type above mentioned, but it is to be understood that the apparatus as a whole, as well as the several parts thereof, may take various forms and may be utilized for cooking articles of various kinds without departing from the spirit of the invention. As herein used the term "waffle" is intended to include any article which may be cooked in such an apparatus and the term "mold" is intended to include any device suitable for receiving and supporting the material to be cooked.

In the particular embodiment of the invention here illustrated the apparatus is mounted on a frame, in the present instance a cabinet 20 and for sanitary reasons it is preferable the cabinet be provided with a closure as indicated in dotted lines at 21 in Fig. 1. The apparatus includes an annular structure arranged below an annular opening 22 in the top wall of the cabinet. This annular structure includes a cooking vessel 23 which is substantially annular but has closed ends 24 and 25 spaced one from the other circumferentially of the annular structure. In the space between the closed ends of the cooking vessel is a batter receptacle 26 which is located close to the end 24 of the cooking receptacle. Between the batter receptacle and the end 25 of the cooking receptacle is a discharge opening 27. The grease in the cooking receptacle 23 may be heated in any suitable manner, as by electric heating units 28. At or adjacent the center of the annular cooking vessel is a rotatable member, here shown as a head 29, supported on and rotated by a vertical shaft 30 which is driven through bevel gearing 31 by an electric motor 32. Pivotally mounted on the rotatable member are a plurality of elongate members 33 each of which extends to a point above the cooking receptacle and is provided with a downwardly extending part 34 which carries a mold 35. Arranged between the cooking vessel and the rotatable member 29 is an annular cam element 36 which is fixed to the frame. The cam surface of this cam element comprises a series of undulations or lobes which extend for a portion of the circumference of the cam element, the remainder of the cam surface being smooth and horizontal. The several elongate members or arms are retained in proper spaced relation by a disk shaped member 36a the circumferential wall of which is provided with a series of vertical slots 36b through which the respective arms extend. This disk shaped member is mounted on the rotatable member 29 for rotation therewith and maintains the arms at all times in their properly spaced relation while permitting them free vertical movement about their pivotal connections with the rotatable member 29.

As the rotatable member rotates each elongate member or arm 33 moves over to the cam surface of the cam element 36 and the undulations are so shaped and arranged as to cause the desired movements to be imparted to the molds as they move about the annular structure of the apparatus. As shown diagrammatically in Fig. 3 the cam surface includes an elevation 39 a part of which extends above the batter receptacle 26 and as the arm 33 moves down the incline surface of this elevation into the succeeding depression the mold is dipped into the batter in the receptacle 26, the depth of the depression being such that the mold will not be completely immersed as it is desirable that the batter should not pass over the upper edge thereof. The arm moves upwardly over the inclined forward side of the depression onto the first of two elevations 40 separated by a shallow depression. The first elevation 40 lifts the mold out of the batter and the depressions between and following the elevations 40 vibrate or shake the mold to remove therefrom excess batter. The arm then passes over an elevation 41 of such height that it lifts the mold above the top of the batter receptacle and carries the same to a position above the rear end of the cooking receptacle 23. As the mold passes beyond the end of the cooking receptacle the arm moves down the inclined surface of the elevation 41 into a depression of such depth that the mold is completely immersed in the hot grease in the cooking vessel. It is desirable that the mold should be moved into and out of the grease immediately following its first immersion therein to prevent the batter from adhering tightly to the mold. For this purpose the arm moves over a series of elevations 42 with the result that the mold is first fully immersed, then removed from the grease and then again immersed. As it moves from the last of the elevations 42 it passes onto the horizontal surface 43 of the cam element and travels over that surface, with the mold immersed in the grease, until the mold approaches the forward or discharge end of the cooking vessel. The circumferential length of the cooking vessel and the speed at which the molds move are such that the waffle will be completely cooked shortly before it reaches the forward end of the cooking vessel, toward which it moves. Just before the mold reaches the forward end 25 of the cooking vessel the arm moves up the rather long inclined elevation 44 which lifts the mold and the waffle out of the grease and carries the same across the forward end wall 25 of the cooking receptacle above the discharge opening 27. The forward edge of the elevation 44 is sharply inclined, or substantially vertical, so that the arm moves rapidly into engagement with the base of the depression following that elevation and the impact of the arm on the base of the depression, above the discharge opening, jars or shakes the mold sufficiently to detach the waffle therefrom and the waffle, as indicated at 45, drops through the discharge opening. The arm then moves up the incline surface of the elevation 39 which carries it over the wall of the batter receptacle 26 as above described. Should a waffle adhere to the mold in spite of the vibration of the latter the movement of the arm over the elevation 39 will drag the waffle on the mold against a brush 46 fixed to the wall of the batter receptacle, and this brush will remove the waffle.

As the mold is lifted out of the grease it is tilted to a position in which the grease lifted therewith will drain out of the mold and out of the waffle. For this purpose each elongate member 33 comprises an inner part 47 pivotally connected at 48 with the rotatable member 29, and an outer part 49 which carries the mold 35 and is connected with the inner part for movement therewith about the pivotal axis 48 but is rotatable with relation to the inner part 47, thus permitting the mold to be tilted. The two parts of the elongate member or arm may be connected one with the other in any suitable manner. As shown more particularly in Figures 4 and 5, a supporting member or block 50 is rigidly secured to the inner part of the arm and is provided with a bearing 51 offset radially from the inner part of the arm and in which the outer part 49 of the arm is rotatably supported. The block 50 is, in the present instance, provided with a roller 51 which travels over the edge of the cam element 36 and supports the arm thereon. Mounted on the outer part 49 of the arm is a gear 52 which meshes with a second gear 53 rotatably mounted on the block 50 and which meshes with a toothed rack 54 which is mounted on a fixed part of the apparatus, in the present instance on the cam element 36, in an inclined position and is so arranged that the gear 53 will engage the same and be rotated thereby as the arm moves up the incline 44. The gear 52 is a mutilated gear and the toothed portion thereof is of such circumferential length that when the part 49 of the arm has been moved through an arc of approximately 90 degrees and the mold thereby moved to an edgewise position, the teeth will move out of mesh with the gear 53, thereby releasing the part 49 of the arm and permitting the mold to move by gravity to its normal horizontal position, which position it occupies when moved into the discharge opening. To retain the gear 53 in mesh with the rack during its upward movement the rack is mounted on a bracket 55 which has an upwardly extending part 56 provided with a flange 57 which overhangs a pintel 58 projecting upon the gear 53 and thus limits the upward movement of the gear.

When the waffle has been released from the mold it moves through the discharge opening 27 onto an inclined chute 59 which discharges the same onto a table 60. The chute is of a partial spiral formation so that as the waffle moves down the same it will be turned over and discharged onto the table in an inverted position, thus bringing its bottom surface uppermost to enable sugar or the like to be deposited thereon. The sugar may be distributed over the waffles in any suitable manner but preferably there is provided a sugar dispenser which automatically distributes sugar over each waffle when the latter is moved beneath the same. Preferably the table 60 is provided with a conveyor 61 onto which the waffles are discharged from the chute 59 and which moves them to a position below the sugar dispenser. The dispenser comprises a receptacle 62 having a hopper shaped bottom 63 and carried by a bracket 64 mounted on the table 60. In the throat of the hopper there is mounted a distributing or shaking element, here shown in the nature of a screen 65, which is supported on a flange 66 at the lower edge of the throat for oscillatory movement about the vertical axis of the throat. This oscillatory member 65 is provided with an arm 67 which extends through a slot 68 in the throat and is connected with an actuating device. Preferably the actuating device is electrically operated and it is here shown as an electromagnet 69 the plunger 70 of which is pivotally connected with the arm 67. The arrangement is such that the energization of the solenoid will quickly move the oscillatory member in one direction and upon the deenergization of the solenoid a spring will return the same to its initial position. This movement is such as to cause sugar to be sifted through the oscillatory screen onto the waffle. Means, such as a second screen 71, is mounted in the throat above the oscillatory screen to relieve the latter of the weight of the sugar. The solenoid 69 is connected in a suitable circuit, such as the circuit for the motor 32, and is automatically controlled to cause vibratory movement to be imparted to the screen upon the delivery of each waffle. A switch 72 is connected in circuit with the solenoid and is controlled by the rotation of the rotatable member which carries the arms 33. The switch is here shown as a push button switch and a resilient finger 73 extends across the end of the switch button and is arranged to be engaged and actuated successively by the teeth of an actuating member 74 which is rigidly secured to the shaft 30. This actuating member has as many teeth as there are arms on the rotatable head 29 and therefore the switch will be closed for an instant as each arm moves over the discharge opening and will then be opened.

Means are also provided for maintaining a constant supply of liquid grease to the cooking vessel. For this purpose a pump 75 is interposed between the cooking receptacle and a grease reservoir 76 and is intermittently operated by means driven by the motor. An overflow pipe 77 connects the cooking vessel with the reservoir so as to maintain the grease therein at a substantially constant level. The pump 75 may be of any suitable character and is here shown as comprising a cup shaped casing closed on one side by a resilient diaphragm 78 which is pressed outwardly by a spring 79. The pump casing is connected with the reservoir 76 by a conduit 80 having therein a check valve 81 to prevent the back flow of grease from the pump to the reservoir. The conduit 82 connects the pump casing with the cooking receptacle. Extending outwardly from the diaphragm 78 is a stud 83 which carries a roller 84 which is arranged to be successively engaged by the lobes 85 of a four point cam 86 rigidly mounted on the shaft 30. Thus the pump will be actuated four times upon each complete rotation of the shaft.

The batter may be supplied to the batter receptacle 26 in any suitable manner but it is desirable that the batter should be maintained at a substantially constant level so that each succeeding mold will enter the batter to the same extent. For this purpose a pump 91 driven from the motor 32 by a belt or chain 90 is connected with a batter reservoir 92 by an intake pipe 93 and is connected with the batter receptacle by a discharge pipe 94, the latter being provided with a cutoff valve 95. An overflow pipe 96 returns excess batter to the reservoir and thus maintains the batter at a substantially constant level in the batter receptacle.

If desired a counter may be provided to register the number of waffles cooked. Such a counter is shown at 87 and is of a usual construction in which the registering mechanism is actuated by a trip finger 88. This trip finger is arranged to be engaged and actuated by the teeth of the switch actuating member 74. As above stated the member 74 has the same number of teeth as there are rotating arms. Consequently the counter will be advanced one unit each time a mold moves over the discharge opening.

While we have shown and described one embodiment of our invention, we wish it to be understood that we do not desire to be limited to the details thereof as various modifications may occur to a person skilled in the art.

Having now fully described our invention what we claim as new and desire to secure by Letters Patent is:

1. A cooking apparatus comprising a substantially annular cooking vessel to contain a heated cooking liquid, a rotatable member adjacent the axis of said cooking vessel, means for rotating said member, an elongate member having an inner part pivotally connected with and rotatable with said rotatable member, a block carried by said part, and an outer part rotatably mounted in said block, a mold carried by said outer part of said elongate member, cam means for actuating said elongate member to cause said mold to move into said cooking vessel through the liquid in said cooking vessel and then out of said cooking vessel, a stationary toothed rack adjacent the point at which said mold is moved out of said cooking vessel, a gear on said block arranged to engage and to be rotated by said rack, a second gear secured to said outer part of said elongate member and meshing with the first mentioned gear to tilt said mold to draining position, said second gear having a peripheral portion without teeth to permit the same to rotate with relation to said first mentioned gear and thereby release the tilted mold for return to its normal position.

2. A cooking apparatus comprising a substantially annular vessel to contain a heated cooking liquid, a receptacle for material to be cooked supported adjacent said annular cooking vessel, a structure supported adjacent the axis of said annular vessel for rotation about a vertical axis, a series of elongate mold supporting members connected with said structure for rotation therewith and for movement with relation thereto about substantially horizontal transverse axes and extending above said annular vessel, molds supported by the respective supporting members above said annular vessel and each adapted to receive and support material to be cooked, means for rotating said rotatable structure to move said molds in an endless path, means for connecting each mold with the corresponding supporting member for movement about the longitudinal axis of said member to draining position, a device having supporting engagement with said mold supporting members and having parts arranged in predetermined positions with relation to said endless path to move said supporting members about their respective horizontal axes and thus move each mold successively into the material in said material receptacle, into and through the heated liquid in said annular vessel to a point adjacent said material receptacle and then out of said liquid, and means for moving each mold to said draining position as it is moved out of said liquid.

3. A cooking apparatus comprising an elongate and relatively narrow vessel to contain a heated cooking liquid, said vessel being shaped to position the closed ends thereof adjacent one to the other, a receptacle for material to be cooked supported in line with and adjacent to one end of said cooking vessel, the other end of said cooking vessel being spaced from said material receptacle to provide a discharge passage for the cooked articles, a movable structure supported adjacent said cooking vessel, a series of mold supporting members connected with said structure for movement thereby in a substantially horizontal endless path above said cooking vessel, molds carried by the respective supporting members and each adapted to receive and support material to be cooked, means for actuating said structure to move said molds in said endless path, said supporting members being movable with relation to said movable structure to impart vertical movement to said molds, and means for actuating said supporting members to move each mold successively into and out of the material in said material receptacle, then into the heated liquid in said cooking vessel and through said liquid to a point adjacent said discharge passage and then from said liquid to said discharge passage, and means controlled by said movable structure to tilt said mold to draining position as it moves to said discharge passage.

4. A cooking apparatus comprising an elongate and relatively narrow vessel to contain a heated cooking liquid, said vessel being shaped to position the closed ends thereof adjacent one to the other, a receptacle for material to be cooked supported in line with and adjacent to one end of said cooking vessel, a movable structure supported adjacent said cooking vessel, a series of mold supporting members connected with said structure for movement thereby in a substantially horizontal endless path above said cooking vessel, molds carried by the respective supporting members and each adapted to receive and support material to be cooked, means for actuating said structure to move said molds in said endless path, said supporting members being movable with relation to said movable structure to impart vertical movement to said molds, means for actuating said supporting members to move each mold successively into and out of the material in said material receptacle, then into the heated liquid in said cooking vessel and through said liquid for the major portion of said endless path, and to then move the same from said cooking vessel, means connecting the outer end portion of each mold supporting member with the inner portion thereof for movement about a longitudinal axis, and means actuated by the movement of said supporting member as said mold moves out of said liquid for moving said outer end portion thereof about said axis and thereby tilting said mold to draining position.

JOSEPH C. SINKWITZ.
ROMAN SZPUR.

REFERENCES CITED

The following references are of record in the file of this patent:

UNITED STATES PATENTS

| Number | Name | Date |
|---|---|---|
| 15,875 | Bowrbin | Oct. 14, 1856 |
| 1,486,986 | Morris et al. | Nov. 4, 1919 |
| 1,492,542 | Bergner | Apr. 29, 1924 |
| 1,781,411 | Reiber | Nov. 11, 1930 |
| 1,961,532 | Snyder | June 5, 1934 |
| 1,961,856 | Hall | June 5, 1934 |
| 1,962,714 | Hawerlander | June 12, 1934 |
| 1,970,447 | Finstor et al. | Aug. 14, 1934 |
| 2,078,641 | Spencer | Apr. 27, 1937 |
| 2,214,262 | Van Winkle Todd | Sept. 10, 1940 |
| 2,447,039 | Stabler | Aug. 17, 1948 |
| 2,452,657 | Hooper | Nov. 2, 1948 |